Patented Dec. 19, 1933

1,939,930

UNITED STATES PATENT OFFICE 1,939,930

COLORING MINERAL MATERIAL

Horatio L. Small, Esmont, Va., assignor to The Philip Carey Manufacturing Company, a corporation of Ohio No Drawing. Application February 3, 1930
Serial No. 425,723

8 Claims. (Cl. 91—70)

My invention is addressed to coloring mineral substances with a relatively resistant and substantially weatherproof covering of coloring substance; and the exemplary embodiment in which it will be described, has to do with the coloring of granular mineral substances such as slate for use as a surfacing material for prepared roofings.

In accordance with the inventions of Harry C. Fisher, as set forth in a co-pending application Ser. No. 26,829, filed Apr. 29, 1925, and in Patents Nos. 1,631,628 and 1,572,425, it has been the practice to color mineral granules by coating them with a soluble silicate, such as silicate of soda, and a pigmenting substance, and after such coating, to subject them to a heat treatment whereby the silicate is dehydrated to a hard, relatively resistant, and substantially insoluble and weatherproof condition. My present invention is an improvement in processes of getting color coatings on granules, and in one aspect is an improvement in the specific processes hereinabove set forth, though its usefulness is not restricted thereto.

The primary objects of my invention are the provision of more intense color coats than have heretofore been possible, and the provision of better coloring effects from the same ingredients in the same proportions.

These and other objects of my invention which will be set forth hereinafter or will be apparent to one skilled in the art upon reading these specifications, I accomplish by that series of process steps and in that product of which I shall now describe an exemplary embodiment, it being understood that my invention is not restricted thereto, but is applicable not only to modifications of the silicate treatments but to the coloring of mineral granules by the use of other coloring media.

Briefly, I have discovered that the same amount of coloring medium, if applied in successive increments with intermediate drying before the final dehydrating step, rather than in one operation, produces a more vivid coloring. Why this is so, is not entirely clear, and I do not wish to be bound by theories with respect thereto. Since very little coloring matter is lost in any event, and since losses by adhesion to the walls of vessels and the like during the mixing operations would appear to increase with the number of applications, the amount of coloring substance imposed upon the granules would not appear to be the explanation of the phenomena. It is characteristic of these processes that interspaced colored areas upon granules will produce the visual effect of satisfactory and even coloring. Color applications in successive increments may, and probably do tend to insure a more complete coverage of the granules, though where the quantity of coloring substance is the same a more complete covering over the same area would seem to imply a thinner covering. Presumably when the exposure of a contrasting natural color in the granules is lessened, the imposed coating will have visually a purer color. Again, the imposition of the coloring medium in successive increments may give the color coating a different physical condition upon dehydration, which may produce a different visual effect. However this may be, I have found that if granules be coated with silicate of soda and a pigment in one operation the color is much less intense than if the same amount of silicate and pigment be used for the same weight of granules, but in two treatments each containing half the amount of silicate and pigment. I do not of course wish to limit myself to the proportion of half and half, since I may vary at will the proportion of coating substance in the two treatments, or employ more than two treatments. Again, instead of dividing the amount of pigment equally between treatments or proportioning the pigment to the amount of silicate employed in the several treatments, I may vary the proportion of pigments between treatments as desired. Indeed, some additional variation in color intensity may be secured by proportioning the amount of pigment in the first treatment to its opacity. Where the pigment is not highly opaque, it is frequently advantageous to put more of it in the subsequent treatments than in the first.

As a specific comparative illustration, but without limitation, I have manufactured green colored granules in accordance with the teachings of the copending application and issued patents hereinabove set forth, using chromic oxide green as the pigment in the proportions of 25 pounds to 125 pounds of silicate of soda for each ton of granules, and using but one treatment. By my process, on the other hand, when using the same proportions of ingredients, but dividing the silicate of soda and pigment into two treatments, each comprising 62½ pounds silicate and 12½ pounds chromic oxide green, with an intermediate drying and a subsequent rapid heat treatment thoroughly to dehydrate the silicate, I have achieved a green of greatly intensified hue, and considerably brighter and more vivid.

The application of coloring substance to the granules may be carried on by any of the processes set forth in the said patents and application, or by the process of my copending application Serial No. 425,722, filed Feb. 3, 1930, or otherwise. Intermediate the treatments, the silicate coating is preferably dried. This may be done in air in any way desired, though it is usually preferable to agitate the granules while drying, as by conveying, tumbling or the like. Or it may be done with the application of heat by any suitable method. Good results may be secured by dehydrating the silicate on the granules between treatments by a heating operation similar to that employed in the final treatment; but I have not found that anything more is necessary between treatments than a simple surface drying. The final dehydration may also be accomplished in a number of ways, but I prefer to pass the granules through a rotary kiln heated by products of combustion in counter-flow.

It will be understood that my invention includes the addition to the silicate of any desired pigment which will give, under the dehydrating treatment, a satisfactory color, and that it also embraces the addition to silicate or other binder of substances other than pigment, such for example as frits, glass-forming materials, fluxes, inert fillers and the like. It is possible not only to vary the amount of pigment between color coatings, but also to change the pigment itself, as between color coatings, so as to gain thereby additional effects. Again, it is possible to employ one or more coatings of silicate not containing a pigmenting substance, so as to give a foundation for subsequent color coatings or a coating of silicate over previous color coatings.

Various modifications may be made in my invention without departing from the spirit thereof.

Having thus described my invention, what I claim as new and desire to secure by Letters Patent, is:—

1. A process of coloring granular mineral material with a given amount of soluble silicate and a pigmenting substance to intensify the color relative to the amount of coloring material used, which comprises applying the silicate of soda and the pigmenting substance in a plurality of separate fractional parts, and then dehydrating the applied parts simultaneously.

2. A process of coloring granular mineral material to intensify the color relative to the amount of coloring material used, which comprises treating said granular mineral material with a coloring substance, rendering said substance non-tacky, again treating said granular mineral material with a coloring substance, and then heat treating the treated material to render the color permanent.

3. That process of coloring granular mineral material to intensify the color relative to the amount of coloring material used, which comprises applying successive color coatings thereto, with intermediate drying, and finally heat treating the coated granular material and its several coatings to render the color permanent.

4. That process of coloring granular mineral material to intensify the color relative to the amount of coloring material used, which comprises imposing upon the surfaces thereof, successive coatings of soluble silicate, at least one of which contains a pigmenting substance, drying the silicate of soda intermediate the successive applications, and finally dehydrating the composite silicate coating thus formed so as to render it weather-resistant.

5. That process of coloring granular mineral material to intensify the color relative to the amount of coloring material used, which comprises separating a predetermined amount of soluble silicate and pigment and applying the same to the granules in successive coatings, with intermediate drying, afterward dehydrating the composite coating thus formed.

6. That process of coloring granular mineral material to intensify the color relative to the amount of coloring material used, which comprises coating the said material with soluble silicate and pigment divided into a plurality of successive applications, the amount of pigment increasing with successive applications, drying the silicate coating intermediate of the applications, and finally dehydrating the composition thus formed so as to render it weather-resistant.

7. That process of coloring granular mineral material to intensify the color relative to the amount of coloring material used, which comprises coating the said material with soluble silicate and pigment divided into a plurality of successive applications, the character of the pigment varying with successive applications, drying the silicate coating intermediate of the applications, and finally dehydrating the composition thus formed so as to render it weather resistant.

8. That process of coloring granular mineral material to intensify the color relative to the amount of coloring material used, which comprises coating said material with a substance in solution, adapted to form a glaze on the granular material upon dehydration, divided into a plurality of successive applications, the coloring material being divided among the several applications of coating material, drying each application preparatory to receiving the next application, and then dehydrating the several applications simultaneously.

HORATIO L. SMALL.